US006917790B1

(12) United States Patent
Braun et al.

(10) Patent No.: US 6,917,790 B1
(45) **Date of Patent: *Jul. 12, 2005**

(54) ANTENNA DEVICE AND METHOD FOR TRANSMITTING AND RECEIVING RADIO WAVES

(75) Inventors: Christian Braun, Stockhom (SE); Olov Edvardsson, Täby (SE); Leif Eriksson, Norrtälje (SE)

(73) Assignee: AMC Centurion AB, Akersberga (SE)

(*) Notice: Subject to any disclaimer, the term of this patent is extended or adjusted under 35 U.S.C. 154(b) by 731 days.

This patent is subject to a terminal disclaimer.

(21) Appl. No.: 09/712,133

(22) Filed: Nov. 15, 2000

Related U.S. Application Data

(63) Continuation of application No. PCT/SE00/02056, filed on Oct. 24, 2000.

(30) Foreign Application Priority Data

Oct. 29, 1999 (SE) ............................................. 9903943

(51) Int. Cl.7 ................................................. H04B 7/02

(52) U.S. Cl. ................. 455/101; 455/67.11; 455/67.16; 455/226.1; 455/115.1

(58) Field of Search .............................. 455/101, 115.1, 455/115.3, 133, 134, 135, 137, 226.1, 226.2, 67.1

(56) References Cited

U.S. PATENT DOCUMENTS

| | | | | |
|---|---|---|---|---|
| 3,693,088 A | | 9/1972 | Rustako, Jr. et al. | |
| 4,123,759 A | | 10/1978 | Hines et al. | |
| 4,958,382 A | * | 9/1990 | Imanishi | 455/277.1 |
| 5,243,358 A | | 9/1993 | Sanford et al. | |
| 5,294,939 A | | 3/1994 | Sanford et al. | |
| 5,463,406 A | | 10/1995 | Vannatta et al. | 343/725 |
| 5,471,146 A | * | 11/1995 | Krayeski et al. | 324/637 |
| 5,486,836 A | | 1/1996 | Kuffner et al. | |
| 5,530,926 A | | 6/1996 | Rozanski | 455/277.2 |
| 5,541,614 A | | 7/1996 | Lam et al. | 343/792.5 |
| 5,589,844 A | | 12/1996 | Belcher et al. | |
| 5,617,102 A | | 4/1997 | Prater | |
| 5,680,142 A | | 10/1997 | Smith et al. | |
| 5,689,439 A | * | 11/1997 | Weerackody et al. | 370/329 |

(Continued)

FOREIGN PATENT DOCUMENTS

| | | |
|---|---|---|
| EP | 0546803 | 8/1992 |
| EP | 0840394 | 6/1998 |
| EP | 0852407 | 8/1998 |
| GB | 2327572 | 7/1997 |
| GB | 2332124 | 9/1999 |
| JP | 10145130 | 5/1998 |
| JP | 10209932 | 7/1998 |
| WO | WO 94/28595 | 12/1994 |
| WO | WO 99/44307 | 9/1999 |

*Primary Examiner*—Temica M. Beamer
(74) *Attorney, Agent, or Firm*—Volentine Francos & Whitt, PLLC

(57) ABSTRACT

An antenna device for transmitting and receiving electromagnetic waves, wherein the antenna device includes a transmitter section and a receiver section. The receiver section includes a receiving antenna structure selectively switchable between a plurality of configuration states. The antenna structure may be switched by a switching device, which is controlled by a control device. The selective switching is effected based upon a first measure representing a reflection coefficient measured at the transmitter section. A method for transmitting and receiving electromagnetic waves includes receiving a measure representing a reflection coefficient and controlling a switching device to selectively switch an antenna structure between a plurality of antenna configuration states in response to the measure representing the reflection coefficient.

41 Claims, 6 Drawing Sheets

U.S. PATENT DOCUMENTS

| | | | | | |
|---|---|---|---|---|---|
| 5,710,995 | A | | 1/1998 | Akaiwa et al. | |
| 5,754,104 | A | | 5/1998 | Saito | |
| 5,777,581 | A | | 7/1998 | Lilly et al. | |
| 5,794,145 | A | * | 8/1998 | Milam | 455/426.1 |
| 5,920,809 | A | | 7/1999 | Clarke | 455/272 |
| 5,933,122 | A | | 8/1999 | Sauer et al. | |
| 5,991,643 | A | | 11/1999 | Chao-Cheng | |
| 6,021,317 | A | | 2/2000 | Irvin | |
| 6,034,638 | A | | 3/2000 | Thiel et al. | |
| 6,046,697 | A | | 4/2000 | Overbury et al. | |
| 6,118,409 | A | * | 9/2000 | Pietsch et al. | 343/703 |
| 6,297,780 | B1 | | 10/2001 | Kirisawa | |
| 6,370,369 | B1 | * | 4/2002 | Kraiem et al. | 455/277.1 |
| 6,392,610 | B1 | * | 5/2002 | Braun et al. | 343/876 |

* cited by examiner

ANTENNA DEVICE AND METHOD FOR TRANSMITTING AND RECEIVING RADIO WAVES

CROSS REFERENCE TO RELATED APPLICATIONS

The present invention claims priority to commonly assigned Swedish Patent Application Serial No. 9903943-02 filed Oct. 29, 1999 and is a continuation of PCT Patent Application Serial No. PCT/SE00/02056 filed on Oct. 24, 2000, the entire contents of all of which are hereby incorporated by reference in their entirety for all purposes. The present application is also related to commonly assigned, co-pending U.S. patent applications entitled "An antenna device for transmitting and/or receiving RF waves", "Antenna device for transmitting and/or receiving radio frequency waves and method related thereto", and "Antenna device and method for transmitting and receiving radio frequency waves", all of which were filed the concurrently herewith. These applications are based on the following corresponding PCT applications: PCT/SE00/02058; PCT/SE00/02059; and PCT/SE00/02057, respectively, all filed on Oct. 24, 2000, the entire contents of which are hereby incorporated by reference in their entirety for all purposes.

TECHNICAL FIELD OF THE INVENTION

The present invention generally relates to the field of antennas and particularly to an antenna device for transmitting and receiving radio waves, to a radio communication device including the antenna device, and to a method for transmitting and receiving radio waves.

BACKGROUND OF THE INVENTION

In the modern communication systems, there is an ever-increasing demand for smaller and more versatile portable terminals such as hand-portable telephones. It is known that the size of an antenna is a factor related to its performance. In addition, the interaction between antenna, telephone body and proximate environment (such as the user) must be considered when designing an antenna device. Moreover, there is often a requirement that two or more frequency bands be supported, further adding to the complexity of the design of antenna devices. It is thus becoming an increasing difficult task to manufacture such compact and versatile terminals, which exhibit good antenna performance under a variety of conditions.

In addition to the considerations discussed above, one must consider the fact that the radiating properties of an antenna device for a small-sized structure (such as a hand-held wireless radio communications device) depend heavily on the shape and size of the support structure. The support may include for example, a printed circuit board (PCB) of the device and terminal casing. All radiation properties, such as resonance frequency, input impedance, bandwidth, radiation pattern, gain, polarization, and near-field pattern are a product of the antenna device itself and its interaction with the PCB and the telephone casing. Thus, all references to radiation properties made below are intended to be for the whole device in which the antenna is incorporated.

Finally, when designing and manufacturing a terminal (hand-portable telephone) today, the antenna is commonly adapted to the characteristics of this specific terminal and to be suited for a particular use in a particular environment. Accordingly, the antenna device cannot be adapted to any specific condition under which a certain terminal is to be used, or for use with multiple terminal types. Thus, each terminal model must be provided with a specifically designed antenna, which normally cannot be optionally used in any other terminal type.

Receiving antennas, with diversity functionality, which can adapt to various radio wave environments, are known. Such diversity functionality systems may be used to suppress noise, and/or undesired signals such as delayed signals, which may cause inter-symbol interference, and co-channel interfering signals, and thus improve the signal quality. However, these diversity functioning antennas require complex receiver circuitry structure, including multiple receiver chains, and a plurality of antenna input ports.

Switchable antennas are known in the literature for achieving diversity. In such switchable antennas, certain characteristics of the antenna system can be varied by connecting/disconnecting segments of the dipole arms to make them longer or shorter, for instance.

However, none of the above arrangements provide any switchable antenna elements that are connected or disconnected on some intelligent basis, e.g. when needed due to signal conditions.

SUMMARY OF THE INVENTION

The present invention is therefore directed to an antenna device, a communication device including the antenna device and a method of receiving and transmitting electromagnetic waves that substantially overcomes one or more of the problems due to the limitations and disadvantages noted above.

It is another object of the invention to provide an antenna device of which certain characteristics are controllable, such as resonance frequency, input impedance, bandwidth, radiation pattern, gain, polarization, and near-field pattern, and diversity.

It is an additional object of the invention to provide an antenna device, which exhibits a controllable interaction between its antenna structure and switching device.

It is still a further object to provide an antenna device that is simple, lightweight, easy to manufacture and inexpensive.

It is yet a further object to provide an antenna device being efficient, easy to install and reliable, particularly mechanically durable, even after long use.

It is still a further object of the invention to provide an antenna device suited to be used as an integrated part of a radio communication device.

The above and other objects may be realized by providing an antenna device including a transmitter section and a receiver section. The receiver section includes a receiving antenna structure selectively switchable between a plurality of configuration states. The antenna structure may be switched by a switching device, which is controlled by a control device. Finally, the selective switching is effected based upon a first measure representing a reflection coefficient measured at the transmitter section.

The above and other objects may be realized by providing a method for transmitting and receiving electromagnetic waves including receiving a measure representing a reflection coefficient and controlling a switching device to selectively switch an antenna structure between a plurality of antenna configuration states in response to the measure representing the reflection coefficient.

The antenna device and method according to the present invention is versatile and adaptable to various terminals and proximate environments.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description of embodiments of the present invention given hereinbelow and the accompanying FIGS. 1–7*f*, which are given by way of illustration only, and thus are not limitative of the invention.

DETAILED DESCRIPTION

In the following description, for purposes of explanation and not limitation, exemplary embodiments disclosing specific details are set forth in order to provide a thorough understanding of the present invention. However, it will be apparent to one skilled in the art that the present invention may be practiced in other embodiments that depart from these specific details. In other instances, detailed descriptions of well-known devices and methods are omitted so as not to obscure the description of the present invention.

As used herein, the expression “antenna structure” is intended to include active elements connected to the transmission (feed) line(s) of the radio communication device circuitry, as well as elements that can be grounded or left disconnected, and hence operate as, e.g., directors, reflectors, impedance matching elements.

Antenna Module

Figure 1:
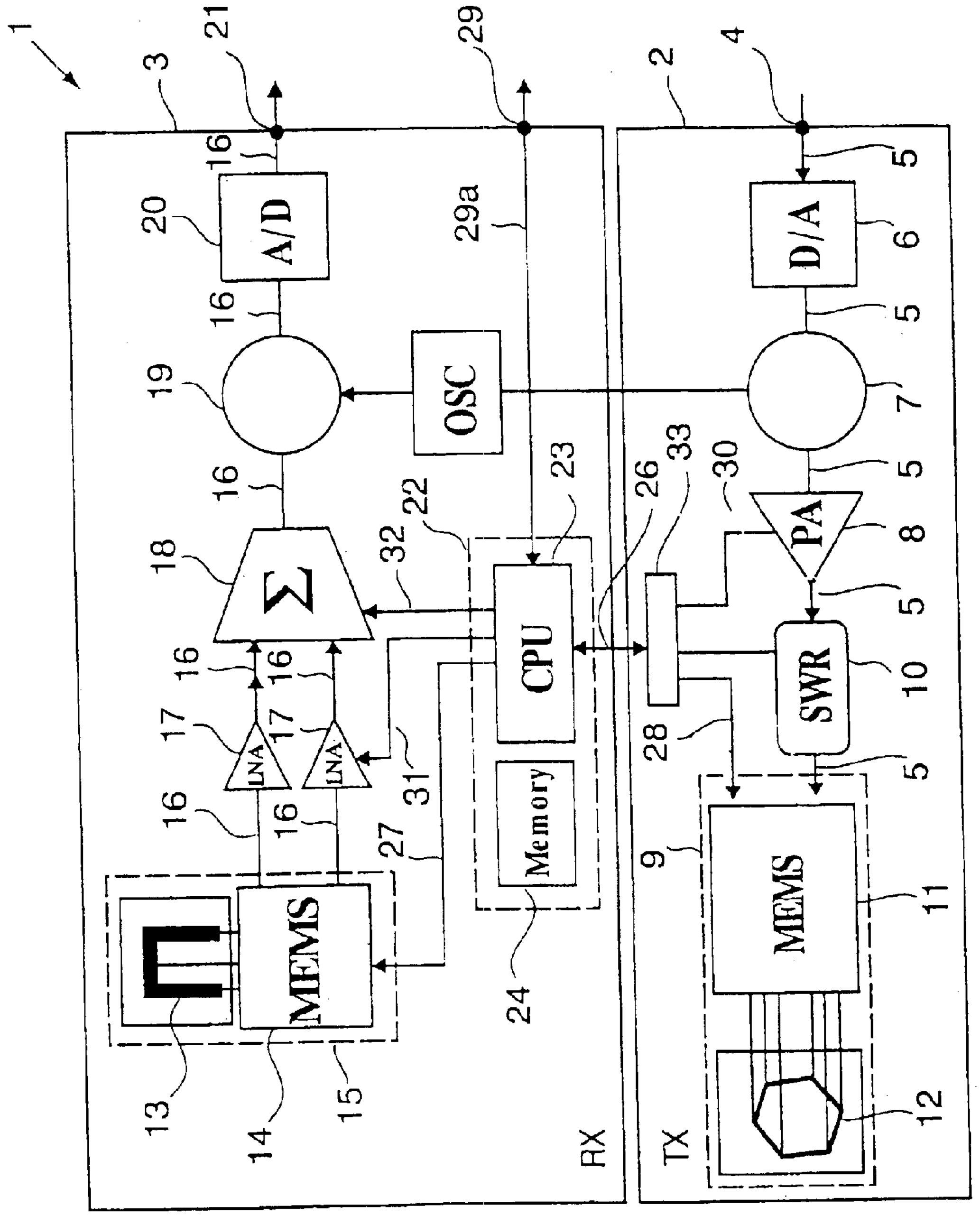
FIG. 1 schematically illustrates a block diagram of an antenna module for transmitting and receiving radio waves according to an embodiment of the present invention.

Turning to FIG. 1, an antenna module 1 (or antenna device) according to an exemplary embodiment of the present invention includes separated transmitter (TX) 2 and receiver (RX) 3 RF sections.

In this illustrative embodiment, the antenna module 1 is the high frequency (HF) part of a radio communication device (not shown) for transmitting and receiving radio waves. Thus, antenna module 1 may be electrically connected to a digital or analog signal processor of the radio communication device (via radio communications circuitry, not shown).

Antenna module 1 is preferably arranged on a carrier (not shown), which may be a flexible substrate, a molded interconnection device (MID) or a printed circuit board (PCB). Such an antenna module PCB may either be mounted, particularly releasably mounted, together with a PCB of the communication device side by side in substantially the same plane or it may be attached to a dielectric support mounted, e.g., on the radio device PCB such that it is substantially parallel with it, but elevated therefrom. The antenna module PCB can also be substantially perpendicular to the PCB of the communication device.

Transmitter section 2 includes an input 4 for receiving a digital signal from a digital transmitting source of the communication device. Input 4 is via a transmission line 5 connected to a digital to analog (D/A) converter 6 for converting the digital signal to an analog signal. Converter 6 is connected, via transmission line 5, to an upconverter 7 for upconverting the frequency of the analog signal to the desired RF frequency. Upconverter 7 is in turn connected, via the transmission line 5, to a power amplifier (PA) 8 that amplifies the frequency converted signal. Power amplifier 8 is further connected to a transmitter antenna device 9 that transfers the amplified RF signal and radiates RF waves in accordance with the signal. A filter (not shown) may be arranged in the signal path before or after the power amplifier.

A device 10 for measuring a reflection coefficient, e.g., voltage standing wave ratio (VSWR), in the transmitter section 2, is connected in transmitter section 2 preferably as shown in FIG. 1 between the power amplifier 8 and the transmitter antenna device 9, or incorporated in transmitter antenna device 9.

The transmitter antenna device 9 includes a switching device 11 connected to the transmission line 5 and a transmitting antenna structure 12, which is switchable between a plurality of (at least two) antenna configuration states. Each antenna configuration state is distinguished by a set of radiation related parameters, such as resonance frequency, input impedance, bandwidth, radiation pattern, gain, polarization, and near-field pattern. According to an alternative embodiment of present invention, transmitter antenna device 9 may include a single transmitting antenna that is permanently connected.

The receiver section 3 includes a receiving antenna structure 13 for receiving RF waves and for generating an RF signal in dependence thereof. The receiving antenna structure 13 is switchable between a plurality of (at least two) antenna configuration states. Each antenna configuration state is distinguished by a set of radiation related parameters. These radiation parameters include, but are not limited to, resonance frequency, input impedance, bandwidth, radiation pattern, gain, polarization and near-field pattern. A switching device 14 is arranged in proximity thereof for selectively switching the antenna structure 13 between the antenna configuration states. The receiving antenna structure 13 and the switching device 14 may be arranged integrally in a receiver antenna device 15.

Antenna structures 12 and 13 may include a plurality of elements connectable to transmission lines 5 and 16, respectively, or to ground (not shown) and/or include a plurality of spaced points of connection connectable to respective transmission lines 5 and 16 or to ground, respectively, which will be described further below.

The antenna structure 13 is further connected, via the transmission line 16, to one or several low noise amplifiers (LNA) 17 for amplifying the received signal. The RF feeding of antenna structure 13 can be achieved via the switching device 14 as in the illustrated case, or can be achieved separately, outside of the switching device 14.

If reception diversity is used, the signals output from the low noise amplifiers 17 are combined in a combiner 18. The diversity combining can be of switching type, or be a weighted summation of the signals.

The transmission line 16 is further connected to a downconverter or downmixer 19 for downconverting the frequency of the signal and to an analog to digital (A/D) converter 20 for converting the received signal to a digital signal. The digital signal is output at 21 to digital processing circuitry of the communication device.

A useful aspect of the present invention relates to a control device 22. The control device 22 may control switching device 14 in receiver section 3. Thereby, selective connecting and disconnecting of components of the receiving antenna structure 13 is effected. This selective connecting/disconnecting of the components of the receiving antenna structure 13 may be base on a measure representing the reflection coefficient at transmitter section 2, where the measure may be a voltage standing wave ratio (VSWR) as measured by measuring device 10. It is useful to measure the VSWR repeatedly during use, by sampling at regular time intervals or continuously. Alternatively, the selective connecting/disconnecting of the components of the receiving antenna structure 13 may be based on a measure of the reflected power. For ease of discussion, hereinbelow the description will refer to VSWR. As will be readily understood by one of ordinary skill in the art having had the benefit of the present disclosure still other reflection measures may be used to effect the connecting/disconnecting.

By means of switching device 14 the connection and disconnection of parts of antenna structure 13 is readily controlled. By reconfiguring the antenna structure 13, which is connected to the transmission line 16, radiation related parameters such as resonance frequency, input impedance, bandwidth, radiation pattern, gain, polarization, and near-field pattern of receiver antenna device 15 can be altered.

The control device 22 may be adapted to control the switching device 14 to switch antenna configuration states, in response to the repeatedly received measured VSWR during use of antenna module 1 in a communication device, so as to dynamically adapt antenna device 1 to objects (such as the user) in the proximate environment of the communication device. Hence, the performance of receiver section 3 of the antenna module may be continuously optimized during use. This affords a great deal of versatility to the use of the antenna device of the present invention. To this end, the antenna device of the present invention is adaptable to a variety of terminal types and proximate environments.

The control device 22 may include a central processing unit (CPU) 23 with a memory 24 connected to the measuring device 10 via connections 25, 26 and to the switching device 14 via line 27. Illustratively, CPU 23 is provided with a suitable control algorithm and the memory 24 is used for storing various antenna configuration data for the switching. The switching device 14 illustratively includes a microelectromechanical system (MEMS) switch device. However, other switching devices based on other known switching technologies could be used. These include, but are not limited to PIN switches and GaAs FET switches.

In operation, CPU 23 receives measured VSWR values from the measuring device 10 through lines 25, 26 and processes each received VSWR value. If a suitable VSWR is found (according to any implemented control algorithm) the CPU sends switching instruction signals to the switching device 14 via the line 27.

According to an exemplary embodiment of the present invention, the antenna structure 12 of transmitter section 2 is switchable between a plurality of (at least two) antenna configuration states, each of which is distinguished by a set of radiation related parameters. These parameters include, but are not necessarily limited to, resonance frequency, impedance, radiation pattern, polarization, and bandwidth. The switching device 11 is arranged for selectively switching the antenna structure in response to control signals sent from the control device 22 via a control line 28.

Furthermore, a control port 29 of antenna module 1 is used for signaling between the CPU 23 and the digital circuitry of the communication device via line **29*a*. Hereby, power amplifier 8, low noise amplifiers 17, and combiner 18 may be controlled via lines 30, 31, and 32, respectively. In FIG. 1, finally, a parallel-serial converter 33 is arranged in the transmitter section 2 for converting parallel signaling lines 25, 28, 30 to a serial line 26. This conversion reduces the number of lines, and thus connections, between the transmitter section 2 and the receiver section 3. Optionally, CPU 23, memory 24 and control port 29 may be located in the transmitter section 2 and hence the parallel-serial converter 33 is arranged in receiver section 3** in order to attain the same object.

The antenna module 1 as illustrated in FIG. 1 has only digital ports (input 4, output 21, and control port 29) and thus, it may be referred to as a digital controlled antenna (DCA) . However, it shall be appreciated that an antenna module according to the present invention does not necessarily have to include A/D and D/A converters, frequency converters or amplifiers. In any of these cases the antenna module will obviously have analog input and output ports.

It is of interest to note that the invention of the present disclosure is useful in a variety of communication devices. Examples of such devices include but are not limited to cordless telephones, telemetry systems, wireless data terminals, wireless/cellular phone and wireless local area network (LAN) devices. Thus, the antenna device of the invention is applicable on a broad scale in various communication devices.

Operation Environments

Next, various operation environments that may affect the performance of the antenna device or module in accordance with the invention will be described.

The antenna parameters, such as resonance frequency, input impedance, bandwidth, radiation pattern, gain, polarization, and near-field pattern of a small-sized wireless communication device are affected by objects in the proximity of the device. As used herein, proximity means the distance within which the effect on the antenna parameters is noticeable. This distance extends roughly to about one wavelength of the transmit/receive signal away from the device.

A small-sized wireless communication device, such as a mobile telephone, can be used in many different close-by environments. For example, the device can be held to the ear as a telephone; it can be put in a pocket; it can be attached to a belt at the waist; or it can be held in the hand. Further, it can be placed on a conductive surface, which can influence antenna parameters. Of course, these are examples and any more operation environments may be enumerated. Common for all environments is that there may be objects in the proximity of the device, thereby affecting the antenna parameters of the device. Environments with different objects in the proximity of the device have different influence on the antenna parameters. For purposes of illustration, two specific operation parameters will in the following be specifically discussed.

The free space (FS) operation environment is obtained by locating lo the radio communication device in empty space, i.e. with no objects in the proximity of the device. Air surrounding the device is here considered free space. Many operation environments can be approximated by the free space environment. Generally, if the environment has little influence on the antenna parameters, it can be referred to as free space.

The talk position (TP) operation environment is defined as the position, in which the radio communication device is held to the ear by a user. The influence on the antenna parameters varies depending on the person that is holding the device and on exactly how the device is positioned. Here, the TP environment is considered as a general case, i.e., covering all individual variations mentioned above.

Figure 2:
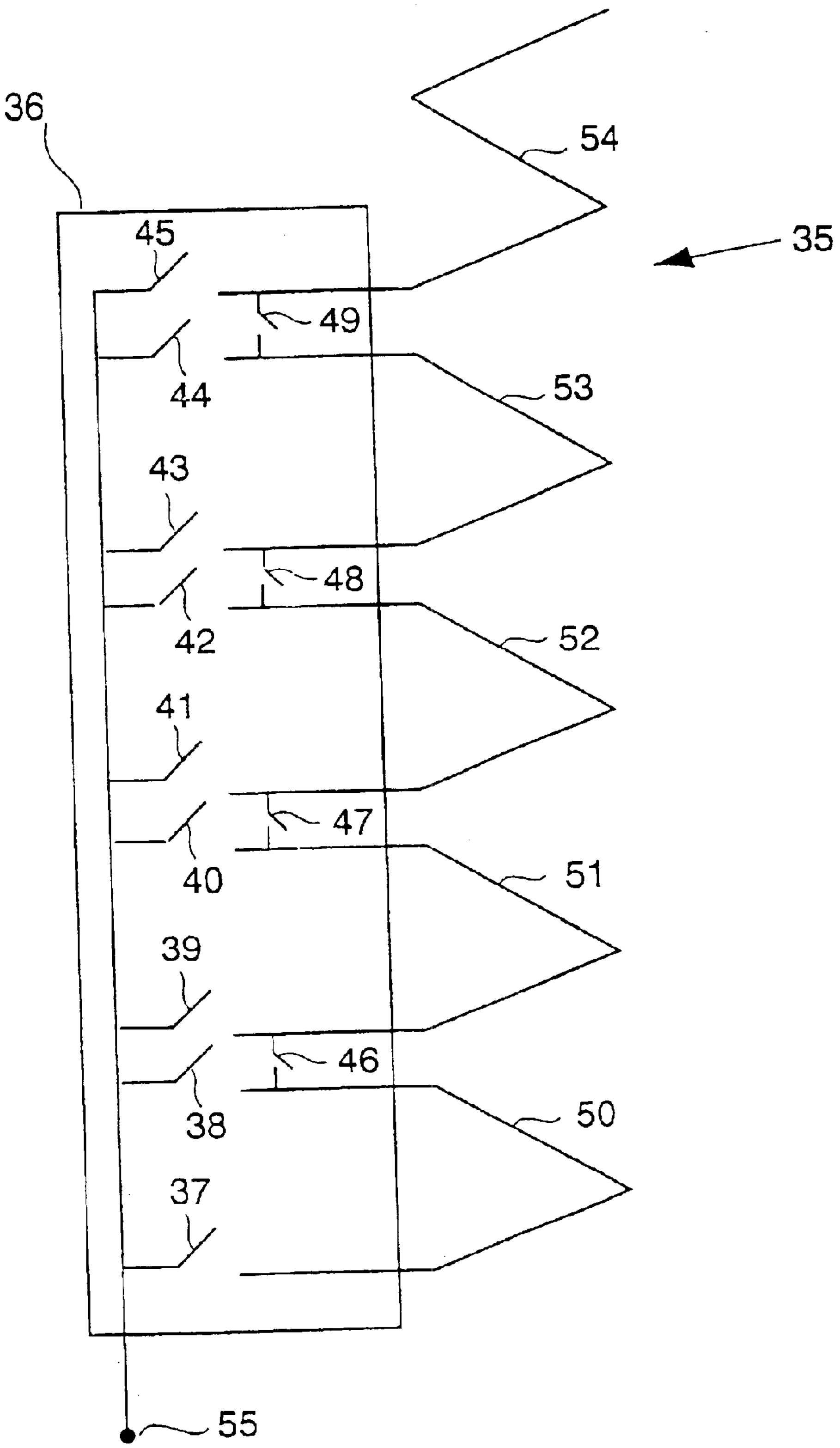
FIG. 2 schematically illustrates receiving or transmitting antenna elements and a switching device for selectively connecting and disconnecting the receiving antenna elements as part of an antenna module according to the present invention.

Resonance Frequency (FIG. 2)

Next, various radiation related parameters that may be controlled in accordance with the invention, such as resonance frequency, input impedance and radiation pattern, will be described in more detail.

Antennas for wireless radio communication devices experience detuning due to the presence of the user. For many antenna types, the resonance frequency may drop a few percent when the user is present, compared to when the device is positioned in free space.

An adaptive tuning between free space and talk position can reduce this problem substantially.

A straightforward way to tune an antenna is to alter its electrical length, and thereby altering the resonance frequency. The longer the electrical length, the lower the resonance frequency. This is also the most straightforward way to create band switching, if the change in electrical length is large enough.

In FIG. 2, a meander-like antenna structure 35 is arranged together with a switching device 36 including a plurality of switches 37–49. The antenna structure 35 may be seen as a plurality of aligned and individually connectable antenna elements 50–54, which, in a connected state, are connected to a feed point 55 through the switching device 36. The feed point 55 is further connected to a low noise amplifier of a receiver circuitry (not shown) of a communication device. Hence, the antenna structure 35 operates as a receiving antenna. The low noise amplifier may alternatively be located in an antenna module together with the antenna structure 35 and the switching device 36. Optionally, the feed point 55 is connected to a power amplifier of a communication transmitter for receiving an RF signal, the antenna structure 35 thereby operating as a transmitting antenna.

A typical example of operation is as follows. Assume that switches 37 and 46–49 are closed and remaining switches are opened and that such an antenna configuration state is adapted for optimal performance when being arranged in a hand-portable telephone located in free space. When the telephone is moved to a talk position, the influence of the user lowers the resonance frequency. In order to compensate for the presence of the user, the switch 49 is opened, reducing the electrical length of the connected antenna structure and thus increasing the resonance frequency. This increase, with an appropriate design of the antenna structure 35 and the switching device 36, will compensate for the reduction as introduced when the telephone is moved from free space to talk position.

The same antenna structure 35 and switching device 36 may also be used for switching between two different frequency bands such as GSM900 and GSM1800. For instance, if an antenna configuration state, which includes antenna elements 50–53 connected to the feed point 55 (switches 37 and 46–48 closed and remaining switches opened), is adapted to suit the GSM900 frequency band, switching to the GSM1800 frequency band may be effectuated by simply opening the switch 47. The opening of the switch 47 reduces the electrical length of the presently connected antenna structure, i.e., elements 50 and 51, to approximately half the previous length, implying that the resonance frequency is approximately doubled, which would be suitable for the GSM1800 frequency band.

Figure 3:
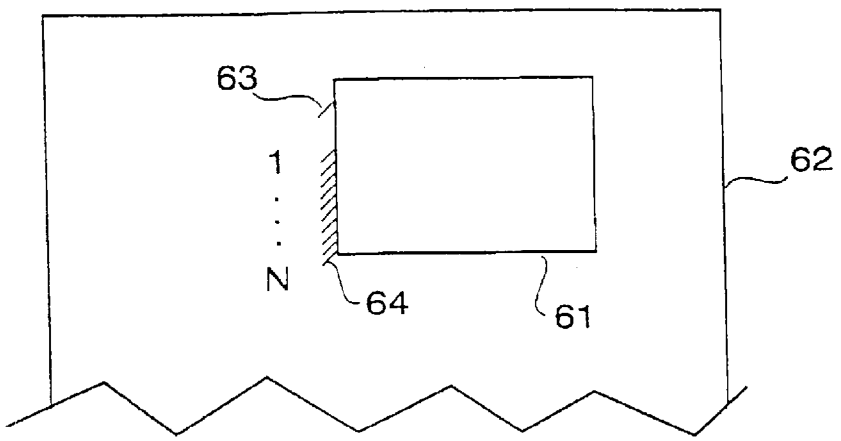
FIG. 3 schematically illustrates a receiving or transmitting antenna structure and a switching device for selectively grounding the receiving antenna structure at a variety of different points as part of an antenna device according to the present invention.

Impedance (FIG. 3)

Instead of tuning a detuned antenna, an adaptive impedance matching, which involves letting the resonance frequency be slightly shifted and compensate this detuning by means of matching, can be performed.

An antenna structure can have feed points at locations. Each location has a different ratio between the E and H fields, resulting in different input impedances. This phenomenon can be exploited by switching the feed point, provided that the feed point switching has little influence on the rest of the antenna structure. When the antenna experiences detuning due to the presence of the user (or other object), the antenna can be matched to the feed line impedance by altering, for example, the feed point of the antenna structure. In a similar manner, RF grounding points can be altered.

FIG. 3 schematically shows an example of such an implementation of an antenna structure 61 that can be selectively grounded at a number of different points spaced apart from each other. Antenna structure 61 is in the illustrated case a planar inverted F antenna (PIFA) mounted on a PCB 62 of a communication device. The antenna structure 61 has a feed line 63 and N different spaced ground connections 64. By switching from one ground connection to another, the impedance of the antenna structure 61 is slightly altered.

Moreover, switching in/out parasitic antenna elements can produce impedance matching, since the mutual coupling from the parasitic antenna element to the active antenna element produces a mutual impedance, which adds to the input impedance of the active antenna element.

Other typical usage positions in addition to FS and TP can be defined, such as waist position, pocket position, and on a steel table. Each case may have a typical tuning/matching, so that only a limited number of points need to be switched through. If outer limits for the detuning of the antenna elements can be found, the range of adaptive tuning/matching that needs to be covered by the antenna device can be estimated. One implementation is to define a number of antenna configuration states that cover the tuning/impedance matching range. There can be equal or unequal impedance difference between each different antenna configuration state.

Radiation Pattern

The radiation pattern of a wireless terminal is affected by the presence of a user or other object in its near-field area. Loss-introducing material will not only alter the radiation pattern, but also introduce loss in radiated power due to absorption. This problem can be reduced if the radiation pattern of the terminal is adaptively controlled. The radiation pattern (near-field) can be directed mainly away from the loss-introducing object. This can serve to reduce the overall losses in radiated power.

A change in radiation pattern requires the currents producing the electromagnetic radiation to be altered. Generally, for a small device (e.g., a hand-portable telephone), relatively large changes in the antenna structure are needed to produce altered currents, especially for the lower frequency bands. According to one aspect of the present invention, radiation patterns may be altered by switching to another antenna type producing different radiation pattern, or to another antenna structure at another position/side of the PCB of the radio communication device. Additionally, the radiation pattern may be altered by switching from an antenna structure that interacts heavily with the PCB of the radio communication device (e.g., whip or patch antenna) to another antenna not doing so (e.g. loop antenna). This will change the radiating currents dramatically since interaction with the PCB introduces large currents on the PCB (the PCB is used as main radiating structure).

Note that an object in the near-field area of a device will alter the antenna input impedance. Therefore, VSWR may be a good indicator of when there are small losses. Small changes in VSWR as compared to VSWR of free space implies small losses due to nearby objects. Accordingly, the monitoring of the VSWR according to the present invention is useful in optimizing the performance of the antenna device for a variety of terminal types and/or proximate environments.

Finally, the discussion above concerns the antenna near-field and loss from objects in the near-field. However, in a general case, one could be able to direct a main beam in the far-field pattern in a favorable direction producing good signal conditions.

Moreover, the polarization can be altered in order to improve the signal conditions.

Figure 4:
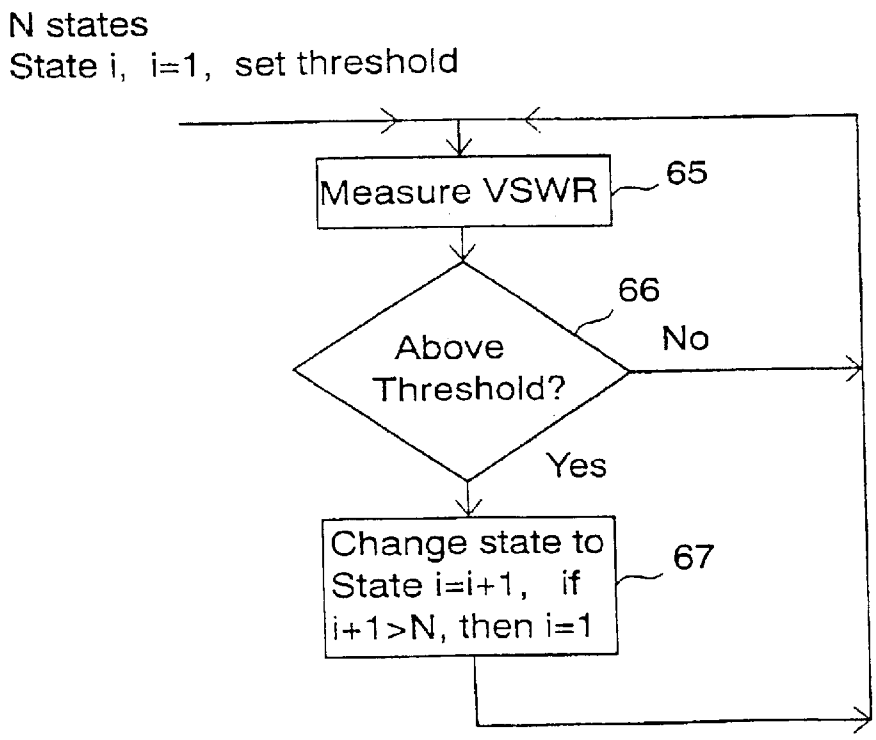
FIG. 4 is a flow diagram of an example of a switch-and-stay algorithm for controlling a switching device of an inventive antenna device.
Figure 5:
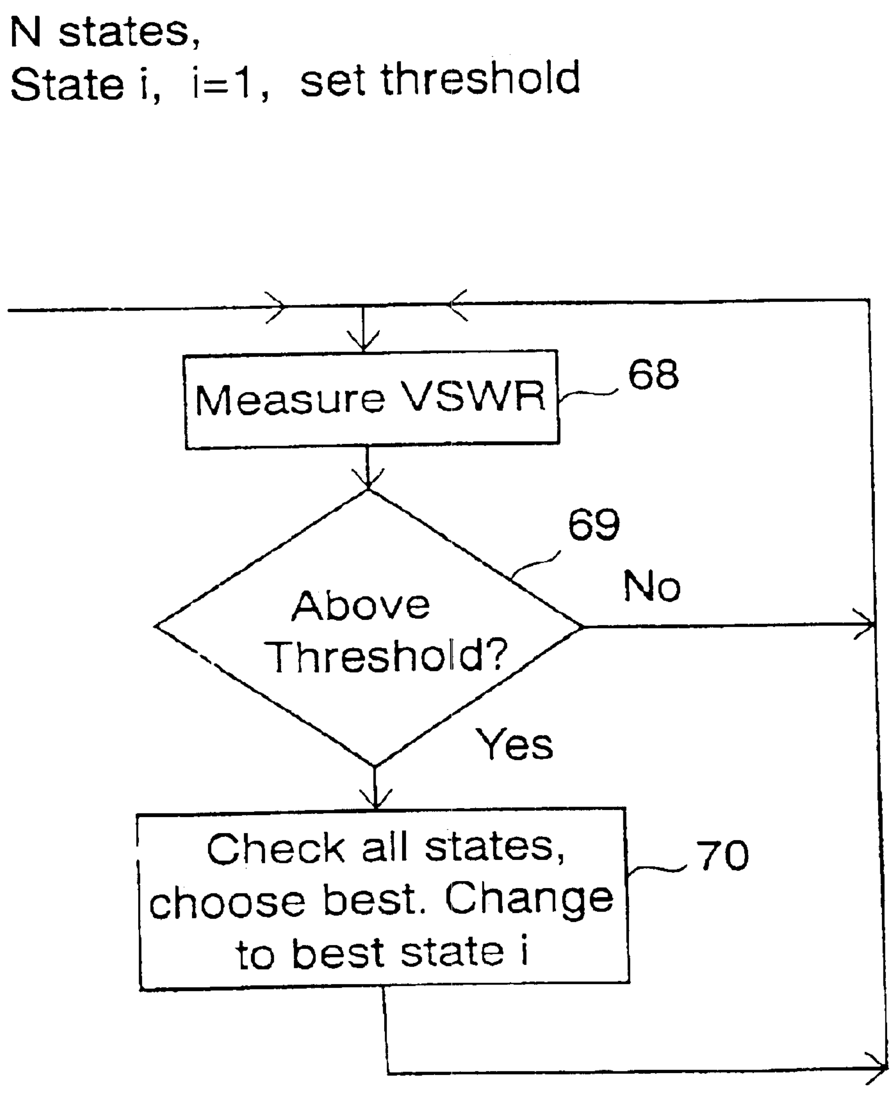
FIG. 5 is a flow diagram of an alternative example of an algorithm for controlling a switching device of an inventive antenna device.
Figure 6:
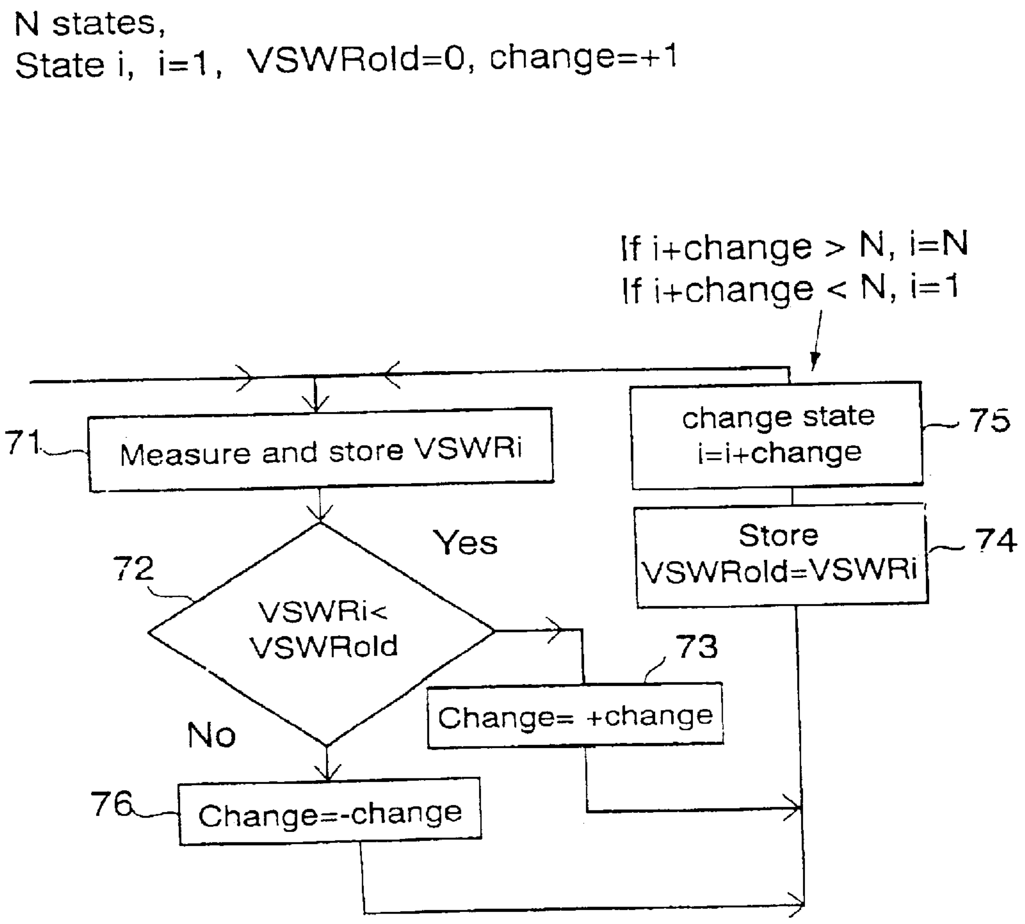
FIG. 6 is a flow diagram of a further alternative example of an algorithm for controlling a switching device of an inventive antenna device.

Algorithms (FIGS. 4–6)

According to an exemplary embodiment of the present invention, the measured VSWR is processed algorithmically, thereby controlling the state of the switches. Illustratively, but not necessarily, the algorithms will be of trial-and-error type, since there is no knowledge about the new state until it has been reached.

Below, with reference to FIGS. 4–6, some examples of algorithms for controlling the antenna are depicted.

The simplest algorithm is probably a switch-and-stay algorithm as shown in the flow diagram of FIG. 4. Here switching is performed between predefined states i=1, . . . , N (e.g. N=2, one state being optimized for FS and the other state being optimized for TP). A state i=1 is initially chosen, whereafter, in a step 65, the VSWR is measured. The measured VSWR is then, in a step 66, compared with predefined limit (the threshold value). If this threshold is not exceeded, the algorithm returns to step 65 If the threshold is exceeded, switching to a new state i=i+1 is performed. If i+1 exceeds N, switching is performed to state 1. After this step, the algorithm returns to step 65. There may be a time delay to prevent switching on a too fast time scale.

Using such an algorithm, each state 1, . . . , N is used until the detected VSWR exceeds the predefined limit. When this occurs the algorithm steps through the predefined states until a state is reached, which has a VSWR below threshold. Both the transmitter and receiver antenna structures can be switched at the same time. An arbitrary number of states may be defined, enabling switching to be performed between a manifold of states.

Another example is a more advanced switch-and-stay algorithm shown in the flow diagram of FIG. 5. In the same way as previous algorithm, N states are predefined, and a state i=1 is initially chosen, whereafter, in a step 68, the VSWR is measured, and, in a step 69, compared with the threshold value. If the threshold is not exceeded the algorithm is returns to step 68. If the threshold is exceeded, the algorithm proceeds to step 69, wherein all states are switched through and VSWR is measured for each state. All VSWR's are compared and the state with lowest VSWR is chosen.

Step 70 may look like:

```
for i=1:N
    switch to State i
    measure VSWR(i)
    store VSWR(i)
switch to State of lowest VSWR
```

Finally the algorithm is returned to step 68. Note that this algorithm may require quite fast switching and measuring of the VSWR, since all states have to be switched through in step 70.

A further alternative algorithm particularly suited for an antenna structure having a manifold of predefined antenna configuration states, which may be arranged so that two adjacent states have radiating properties that deviates only slightly is shown in FIG. 6. N states are predefined, and initially a state i=1 is chosen, a parameter VSWRold is set to zero, and a variable "change" is set to +1. In a first step 71 VSWRi (VSWR of state i) is measured and stored, whereafter in a step 72 the VSWRi is compared with VSWRold. If, VSWRi<VSWRold, the algorithm proceeds to step 73, wherein a variable "change" is set to +change (this step is not really necessary). Steps 74 and 75 follow, wherein VSWRold is set to present VSWR, i.e. VSWRi, and the antenna configuration state is changed to i+"change", i.e. i=i +change, respectively. The algorithm is then returned to step 71. If, VSWRi>VSWRold, the algorithm proceeds to step 76, wherein the variable "change" is set to −change. Next, the algorithm continues to steps 74 and 75. Note that in this case the algorithm changes "direction".

It is important to use a time delay to run the loops (71, 72, 73, 74, 75, 71 and 71, 72, 76, 74, 75, 71, respectively) only at specific time steps, as the switched state is changed at every loop turn. At 72 a present state (VSWRi) is compared with the previous one (VSWRold) . If the VSWR is better than the previous state, a further change of state in the same "direction" is performed. When an optimum is reached the antenna configuration state as used will typically oscillate between two adjacent states at every time step. When end states 1 and N, repectively, are reached, the algorithm may not continue further to switch to states N and 1, respectively, but stays preferably at the end states until it switches to states 2 and N−1, respectively.

The algorithm assumes relatively small differences between two adjacent states, and that the antenna configuration states are arranged so that the rate of changes between each state is roughly equal. This means that between each state there is a similar quantity of change in, for example, resonance frequency. For example, small changes in the separation between feed and RF ground connections at a PIFA antenna structure would suit this algorithm perfectly, see FIG. 3.

In all described algorithms it may be necessary to perform the switching only in specific time intervals adapted to the operation of the radio communication device.

As a further alternative (not shown in the Figures), control device 22 of FIG. 1 may hold a look-up table with absolute or relative voltage standing wave ratio (VSWR) ranges, of which each is associated with a respective antenna configuration state. Such a provision would enable control device 22 to refer to the look-up table for finding an appropriate antenna configuration state given a measured VSWR value, and to adjust the switching device 14 to the appropriate antenna configuration state.

It shall be appreciated that all depicted algorithms are applicable for controlling the switching of any of the receiving and transmitting antenna structures.

Further Antenna Configurations (FIGS. 7*a–f*)

Next, with reference to FIGS. 7*a–f*, various examples of arrangements of receiving antenna structures and switching devices for selectively connecting and disconnecting the receiving antenna structure as part of antenna module 1 according to the present invention, will briefly be described.

Figure 7A:
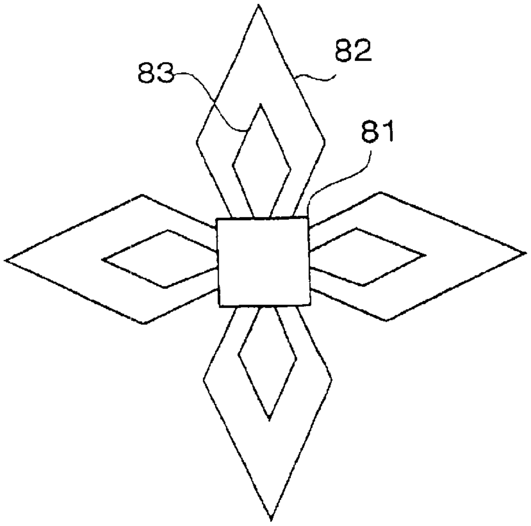
FIGS. 7*a*–7*f* schematically illustrates receiving or transmitting antenna elements and a switching device for selectively connecting and disconnecting the receiving antenna elements as part of an antenna module according to yet a further embodiment of the present invention.

FIG. 7*a* shows an antenna structure pattern arranged around a switching device or unit 81. The antenna structure includes receiving antenna elements, here in the form of four loop-shaped antenna elements 82. A loop-shaped parasitic antenna element 83 is formed within each of the loop-shaped antenna elements 82. The switching unit 81 includes a matrix of electrically controllable switches (not shown) arranged for connecting and disconnecting antenna elements 82 and 83. The switches may be PIN diode switches, GaAs field effect transistors (FET), or microelectromechanical system (MEMS) switches. The switching unit 81 can connect the loop-shaped antenna elements 82 in parallel or in series with each other, or some elements can be connected in series and some in parallel. Further, one or more elements can be completely disconnected or connected to ground (not shown).

Figure 7B:
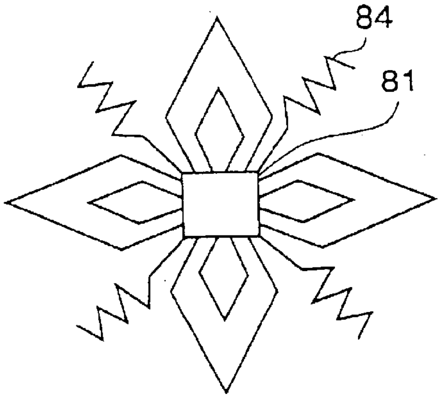

FIG. 7*b*shows an alternative antenna structure including all the antenna elements of FIG. 7*a*and further includes a meander-shaped antenna element 84 between each pair of loop-shaped elements 82, 83. One or more of the meander-shaped antenna elements 84 can be used separately or in any combination with the loop antenna elements.

Figure 7C:
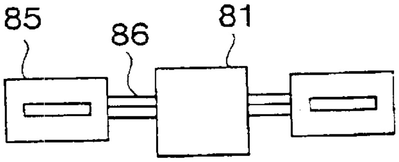
Figure 7D:
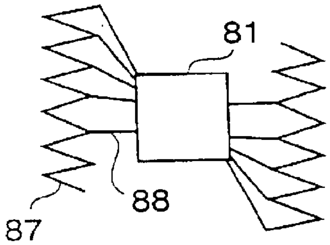
Figure 7E:
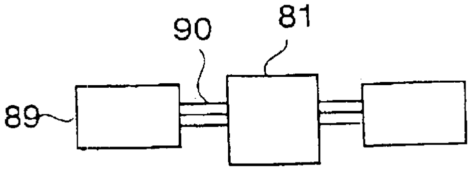

FIGS. 7*c–e* show antenna structures including two slot antenna elements 85, two meander-shaped antenna elements 87, and two patch antenna elements 89, repectively, connected to the switching device 81. Each antenna element 85, 87, 89 may be fed at alternative spaced feed connections 86, 88, 90.

Figure 7F:
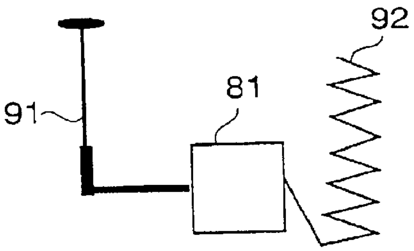

Finally, FIG. 7*f* shows an antenna structure including a whip antenna and/or helical 91 and a meander-shaped antenna element 92 connected to the switching device 81.

The invention having been described in detail, it will be readily apparent to one having ordinary skill in the art that the invention may be varied in a variety of ways. Such variations are not to be regarded as a departure from the scope of the invention. All such modifications as would be obvious to one skilled in the art are intended to be included within the scope of the appended claims.

We claim:

1. An antenna device for transmitting and receiving radio waves, connectable to a portable radio communication terminal device, comprising:

a transmitter section and a receiver section, said receiver section including a receiving antenna structure switchable between a plurality of antenna configuration states, each antenna configuration state being distinguished by a set of radiation related parameters, and a switching device capable of selectively switching said receiving antenna structure between said plurality of antenna configuration states, the antenna device further comprising a measuring device capable of receiving a first measure representing a reflection coefficient as measured at said transmitter section; and a control device capable of controlling said switching device of said receiver section, wherein said selective switching of said receiving antenna structure between said plurality of antenna configuration states is effected, in response to said first measure representing said reflection coefficient.

2. The antenna device as claimed in claim 1, wherein said measuring device is capable of repeatedly receiving a first measure representing the reflection coefficient.

3. The antenna device as claimed in claim 2, wherein said control device is adapted to control said switching device to switch between said plurality of antenna configuration states in response to said repeatedly received first measure representing said reflection coefficient.

4. The antenna device as claimed in claim 1, wherein each of said plurality of antenna configuration states is adapted for use of the antenna device in said portable radio communication terminal device in a respective predefined operation environment.

5. The antenna device as claimed in claim 4, wherein a first antenna configuration state of said plurality of antenna configuration states is adapted for use of the antenna device in said portable radio communication terminal device in free space and a second antenna configuration state of said plurality of antenna configuration states is adapted for use of the antenna device in said portable radio communication terminal device in a talk position.

6. The antenna device as claimed in claim 5, wherein a third antenna configuration state of said plurality of antenna configuration states is adapted for use of the antenna device in said portable radio communication terminal device at a waist position of a user.

7. The antenna device as claimed in claim 6, wherein a fourth antenna configuration state of said plurality of antenna configuration states is adapted for use of the antenna device in said portable radio communication terminal device in a pocket position of the user.

8. The antenna device as claimed in claim 1, wherein said antenna device is arranged for switching frequency bands in response to said received first measure representing the reflection coefficient.

9. The antenna device as claimed in claim 1, wherein said antenna device is arranged for connection and disconnection of reception diversity functionality, in response to said received first measure representing the reflection coefficient.

10. The antenna device as claimed in claim 1, wherein said transmitter section comprises:

a transmitting antenna structure switchable between a plurality of transmitting antenna configuration states, said plurality of transmitting antenna configuration states being distinguished by another set of radiation related parameters; and a transmitter switching device for selectively switching said transmitting antenna structure between said plurality of transmitting antenna configuration states, wherein said control device is adapted to control said transmitter switching device of said transmitter section, and wherein said selective switching of said transmitting antenna structure between said plurality of transmitting antenna configuration states is in response to said received first measure representing the reflection coefficient.

11. The antenna device as claimed in claim 1, wherein said control device is adapted to control at least said switching device of said receiver section to selectively switch said receiving antenna structure between said plurality of antenna configuration states in response to said received first measure representing said reflection coefficient exceeding a threshold value.

12. The antenna device as claimed in claim 1, wherein said control device is adapted to control at least said switching device of said receiver section to selectively switch the receiving antenna structure through said plurality of antenna configuration states;

said measuring device is adapted to receive a respective measure representing the reflection coefficient for each of said plurality of antenna configuration states; and said control device is further adapted to control said switching device of said receiver section to selectively switch said receiving antenna structure to one of said plurality of antenna configuration states with a lowest measure representing said reflection coefficient, in response to said received first measure representing a reflection coefficient exceeding a threshold value.

13. The antenna device as claimed in claim 1, wherein said control device compares said received first measure representing said reflection coefficient with a previously received measure representing said reflection coefficient, and said control device is adapted to control at least said switching device of said receiver section to selectively switch said receiving antenna structure between said plurality of antenna configuration states in response to said comparison.

14. The antenna device as claimed in claim 1, wherein said control device includes a look-up table with absolute or relative reflection coefficient measurement ranges, each of said reflection coefficients being associated with one of said plurality of antenna configuration states, and wherein said control device is arranged to refer to said look-up table to control at least the switching device of said receiver section.

15. The antenna device as claimed in claim 1, wherein at least said plurality of antenna configuration states comprise different numbers of connected receiving antenna elements.

16. The antenna device as claimed in claim 1, wherein said plurality of antenna configuration states comprise differently arranged feed connections.

17. The antenna device as claimed in claim 1, wherein at least said plurality of antenna configuration states comprise differently arranged RF ground connections.

18. The antenna device as claimed in claim 1, wherein said control device is arranged in said receiver section.

19. The antenna device as claimed in claim 1, wherein said control device comprises a central processing unit and a memory for storing antenna configuration data.

20. The antenna device as claimed in claim 1, wherein said switching device comprises a microelectromechanical system (MEMS) switch device.

21. The antenna device as claimed in claim 1, wherein said receiving antenna structure comprises a switchable antenna element chosen from the group consisting essentially of meander, loop, slot, patch, whip, spiral, helical and fractal configurations.

22. An antenna device as recited in claim 1, wherein said radiation related parameters include at least one of resonance frequency, input impedance, bandwidth, radiation pattern, gain, polarization and near field pattern.

23. An antenna device as recited in claim 10, wherein said radiation related parameters include at least one of resonance frequency, input impedance, bandwidth, radiation pattern, gain, polarization and near field pattern.

24. The antenna device of claim 1, wherein said transmitter and receiver sections are separated.

25. The antenna device of claim 1, wherein said receiving antenna structure comprises a plurality of individually switchable antenna elements.

26. The antenna device of claim 25, wherein said receiving antenna structure has different electrical length in different ones of said plurality of antenna configuration states.

27. The antenna device of claim 25, wherein said antenna structure is optimized for different frequency bands in different ones of said plurality of antenna configuration states.

28. The antenna device of claim 1, wherein said receiving antenna structure comprises a plurality of spaced connection points individually connectable to a transmission line or to RF ground by said switching device.

29. The antenna device of claim 1, wherein said control device is provided for controlling said switching device to switch between said plurality of antenna configuration states depending on a repeatedly received measured VSWR during use, so as to dynamically adapt the antenna device to objects in a close-by environment of the portable radio communication terminal device.

30. An antenna device connectable to a portable radio communication terminal device, comprising:

transmitter and receiver sections, said transmitter section including an input for receiving a first RF signal from a transmitter circuitry of said portable radio communication terminal device, a power amplifier for amplifying said received first RF signal to provide an amplified signal, and a transmitting antenna element for receiving said amplified signal and for radiating RF waves responsive thereto, said receiver section including an antenna structure switchable between a plurality of antenna configuration states to receive a second RF signal, each of said plurality of antenna configuration states being distinguished by a set of radiation related parameters, a switching device for selectively switching said antenna structure between said plurality of antenna configuration states, a low noise amplifier for amplifying said received second RF signal to provide an amplified second signal, and an output for outputting said amplified second signal to a receiver circuitry of said portable radio communication terminal device, the antenna device further comprising a measuring device capable of receiving a measure representing a reflection coefficient as measured at the transmitter section; and a control device capable of controlling the switching device of said receiver section in response to said measure representing the reflection coefficient.

31. In a portable radio communication device, a method for transmitting and receiving electromagnetic waves, the method comprising:

receiving from a transmitter a measure representing a reflection coefficient; and controlling a switching device to selectively switch an antenna structure of an antenna device of a receiver between a plurality of antenna configuration states in response to said measure representing the reflection coefficient, each of said plurality of antenna configuration states being distinguished by a set of radiation related parameters.

32. A method as recited in claim 31, wherein the set of radiation related parameters include at least one of resonance frequency, impedance, radiation pattern, polarization and bandwidth.

33. The method as claimed in claim 31, comprising repeatedly receiving from the transmitter a measure representing the reflection coefficient.

34. The method as claimed in claim 32, comprising controlling said switching device to switch between said plurality of antenna configuration states in response to said repeatedly received measure representing said reflection coefficient during use of said antenna device in said portable radio communication device, so as to dynamically adapt said antenna device to objects in a vicinity of said portable radio communication device.

35. The method as claimed in claim 31, wherein each of said plurality of antenna configuration states is adapted for use of the antenna device in said portable radio communication device in a respective predefined operation environment.

36. The method as claimed in claim 31, further comprising switching frequency bands in response to said received measure representing said reflection coefficient.

37. The method as claimed in claim 31, further comprising connecting or disconnecting reception diversity functionality, in response to said received measure representing the reflection coefficient.

38. The method as claimed in claim 31, further comprising controlling the switching device to selectively switch said antenna structure between said plurality of antenna configuration states in response to said received measure representing said reflection coefficient exceeding a threshold value.

39. The method as claimed in claim 31, wherein in response to said received measure representing said reflection coefficient exceeding a threshold value, the method further comprising:

controlling the switching device to selectively switch the antenna structure through said plurality of antenna configuration states;

receiving a respective measure representing the reflection coefficient for each of said plurality of antenna configuration states; and controlling the switching device to selectively switch the antenna structure to an antenna configuration state with a lowest measure representing the reflection coefficient.

40. The method as claimed in claim 31, further comprising comparing said received measure representing said reflection coefficient with a previously received measure representing said reflection coefficient, and controlling the switching device to selectively switch said antenna structure between said plurality of antenna configuration states in response to said comparison.

41. The antenna device as claimed in claim 31, further comprising storing a look-up table with absolute or relative reflection coefficient measurement ranges, each of said absolute or relative reflection coefficient measurement ranges being associated with a respective antenna configuration state, and referring to said look-up table for controlling at least said switching device.

* * * * *